(12) United States Patent
Ziegler et al.

(10) Patent No.: US 9,764,436 B2
(45) Date of Patent: Sep. 19, 2017

(54) PRODUCTION LINE FOR MACHINING AT LEAST ONE SURFACE COMPONENT AND METHOD FOR MACHINING THE AT LEAST ONE SURFACE COMPONENT IN THE PRODUCTION LINE

(71) Applicant: GM GLOBAL TECHNOLOGY OPERATIONS LLC, Detroit, MI (US)

(72) Inventors: Thomas Ziegler, Kriftel (DE); Klaus Scherer, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 17 days.

(21) Appl. No.: 14/707,642

(22) Filed: May 8, 2015

(65) Prior Publication Data

US 2015/0321300 A1 Nov. 12, 2015

(30) Foreign Application Priority Data

May 8, 2014 (DE) .......................... 10 2014 006 683

(51) Int. Cl.
| | |
|---|---|
| *B23P 23/04* | (2006.01) |
| *B23P 23/06* | (2006.01) |
| *B25J 11/00* | (2006.01) |
| *B21D 19/02* | (2006.01) |

(52) U.S. Cl.
CPC .............. *B23P 23/04* (2013.01); *B21D 19/02* (2013.01); *B23P 23/06* (2013.01); *B25J 11/005* (2013.01); *B23P 2700/50* (2013.01); *Y10T 29/5136* (2015.01)

(58) Field of Classification Search
CPC ....... B23P 23/04; B23P 23/06; B23P 2700/50; B21D 19/02; B25J 11/005; Y10T 29/5136
See application file for complete search history.

(56) References Cited

U.S. PATENT DOCUMENTS

| | | | |
|---|---|---|---|
| 5,562,538 A | 10/1996 | Suyama | |
| 5,777,267 A * | 7/1998 | Szydel | ................. B25J 19/0025 174/72 A |
| 6,098,440 A | 8/2000 | Gorgen | |

(Continued)

FOREIGN PATENT DOCUMENTS

| | | |
|---|---|---|
| DE | 4034625 A1 | 5/1992 |
| DE | 4222741 A1 | 4/1993 |

(Continued)

OTHER PUBLICATIONS

German Patent Office, German Search Report for German Application No. 102014006683.5, dated Mar. 17, 2015.

(Continued)

*Primary Examiner* — John C Hong
(74) *Attorney, Agent, or Firm* — Lorenz & Kopf LLP

(57) ABSTRACT

A production line for machining a surface component with a first machining station and a second machining station is disclosed. The first machining station includes a separating device configured to separate a surface component along a machining path. The second machining station includes a bending/forming device configured to form and/or bend the surface component in a bending/forming position. The first machining station and the second machining station are sequentially arranged one directly after the other and/or linked together.

13 Claims, 4 Drawing Sheets

(56) References Cited

U.S. PATENT DOCUMENTS

| | | | |
|---|---|---|---|
| 6,237,675 B1 | 5/2001 | Oehring et al. | |
| 9,321,092 B2 | 4/2016 | Takasue et al. | |
| 2004/0237284 A1* | 12/2004 | Nakamura | G05B 19/41865 29/564 |
| 2006/0090530 A1 | 5/2006 | Hammer et al. | |
| 2006/0137779 A1 | 6/2006 | Brodt et al. | |
| 2007/0175040 A1 | 8/2007 | Bayer et al. | |
| 2011/0283851 A1 | 11/2011 | Overrath et al. | |
| 2012/0067104 A1 | 3/2012 | Keys et al. | |
| 2015/0362914 A1* | 12/2015 | DeSimone | G05B 19/4099 700/118 |

FOREIGN PATENT DOCUMENTS

| | | |
|---|---|---|
| DE | 4208160 A1 | 9/1993 |
| DE | 10135561 C1 | 3/2003 |
| DE | 102005011829 A1 | 9/2006 |
| DE | 102009016027 A1 | 10/2010 |
| DE | 102013210878 A1 | 12/2014 |
| EP | 2554291 A1 | 2/2013 |
| JP | H07155240 A | 6/1995 |
| JP | 2007090447 A | 4/2007 |
| WO | 2014173658 A1 | 10/2014 |

OTHER PUBLICATIONS

Great Britain Patent Office, Great Britain Search Report for Great Britain Application No. GB1507652.4, dated Oct. 8, 2015.

\* cited by examiner

PRODUCTION LINE FOR MACHINING AT LEAST ONE SURFACE COMPONENT AND METHOD FOR MACHINING THE AT LEAST ONE SURFACE COMPONENT IN THE PRODUCTION LINE

CROSS-REFERENCE TO RELATED APPLICATION

This application claims priority to German Patent Application No. 102014006683.5, filed May 8, 2014, which is incorporated herein by reference in its entirety.

TECHNICAL FIELD

The present disclosure pertains to a production line for machining at least one curved component, and to a method for machining the at least one curved component in the production line.

BACKGROUND

During the manufacture of a vehicle body, sheet metal parts are often machined in production lines with one or more machining stations. The latter can exhibit so-called stamping and bending tools for stamping and forming sheet metal part into a desired contour and specific forming positions.

Desirable features and characteristics will become apparent from the subsequent summary and detailed description, and the appended claims, taken in conjunction with the accompanying drawings and this background.

SUMMARY

The present disclosure provides a functionally improved and more flexible production line for the manufacture of at least one curved component, and specifically a production line for machining at least one surface component by a method for machining at least one surface component.

A production line for machining at least one curved component is proposed. The at least one surface component preferably includes a first and a second curved component, which are identical in construction. In particular, the first curved component and the second curved component can be machined sequentially within the production line in a different manner. The production line preferably includes the surface component. Alternatively, the first and second surface components can vary in design, and additionally be sequentially machined within the production line in a different manner.

The production line includes a first machining station and a second machining station. The surface component preferably runs through the first and second machining stations of the production line for machining purposes. In particular, the first and second machining stations are spatially separated and/or spaced apart from each other.

The first machining station includes at least one separating device, with which the surface component can be separated along a machining path. For example, the separating device performs a separating process on the surface component, which gives it a specific contour, in particular an outer contour.

The second machining station includes a bending/forming device, with which the surface component can be formed and/or bent, in particular bent over, at least in one bending/forming position. For example, the bending/forming position is arranged within the surface extension of the surface component and/or in an edge area or edge section of the surface component. The surface component is optionally formed and/or bent over a contour, e.g., outer contour, during a bending/forming process of the bending/forming device. As an alternative or additional option, at least one edge section of the surface component is formed and/or bent, in particular bent over and/or folded.

The first machining station and the second machining station are sequentially arranged one directly after the other and/or linked together. The first and second machining stations are preferably directly interlinked in terms of material flow and/or information technology. In particular, the machining of the first surface component in the first machining station and of the second surface component in the second machining station is preferably simultaneous and/or synchronized. The first machining station and the second machining station are arranged and/or linked together in such a way that, once machined, in particular after subjected to the separating process, the first surface component is conveyed from the first machining station to the second machining station, where it undergoes further machining, in particular where it is formed and/or bent over. For example, the first and second machining stations can be linked together by means of an individual transport vehicle, e.g., by means of a rack feeder and/or by means of a mobile or stationary industrial robot. Interlinking within the framework of the present disclosure can also take place via conveyor belts, in particular continuous conveyor belts.

In a preferred embodiment of the present disclosure, the surface component is designed as a metal sheet. The metal sheet is preferably designed for integration into a vehicle body, in particular the body of an automobile or truck. For example, the curved component, in particular one designed as the metal sheet for integration into the vehicle body, exhibits a surface area of at least 0.3 square meters, preferably of at least 0.7 square meters, in particular of at least 1.2 square meters and/or of at most 3.5 square meters.

One preferred implementation of the present disclosure provides that the separating device be designed as a first jointed-arm robot. The first jointed-arm robot preferably includes a separating tool for executing the separating process for the surface component. In particular, the separating tool can be joined with the jointed-arm robot, e.g., placed thereupon, moved and/or operated by the latter. The separating tool is preferably designed as a laser tool. Also possible within the framework of the present disclosure are other separating tools, e.g., water jet cutting tools, chopping tools, abrading tools or clamping tools.

Another preferred embodiment of the present disclosure provides that the bending/forming device be designed as a second jointed-arm robot. The second jointed-arm robot preferably includes a bending/forming tool for bending and/or forming the at least one surface component. In particular, the bending/forming tool can be connected with the jointed-arm robot, e.g., placed thereupon, moved and/or operated by the latter. The bending/forming tool is preferably designed as a bending and forming tool. Possible within the framework of the present disclosure is the use of additional forming tools, e.g., pressure forming tools. It is especially preferred that the bending/forming tool be designed as tongs for gripping and bending a section of the surface component. As an alternative or additional option, the bending/forming tool of the bending/forming device can exert pressure on at least one section of the surface component, and thereby form, bend or curve the at least one section. In this case, the bending/forming device can be designed as a stamp, for example.

In a preferred embodiment of the present disclosure, the production line includes an additional machining station. The additional machining station preferably exhibits a forming device. For example, the forming device is designed as a forming press. In particular, the forming device can be used to flatly form and optionally further press the surface component in its surface extension. In particular, the forming device forms at least 70 percent, preferably at least 80 percent, of the surface extension of the surface component. It is also possible for the forming device to completely flatly form and optionally supplementally press the surface component.

It is especially preferred that the additional machining station be arranged immediately before the first machining station. In particular, the additional machining station is linked with the first machining station. The additional machining station and the first machining station are directly interlinked in terms of material flow and/or information technology. In particular, the first surface component is flatly formed on the additional machining station, and the second surface component is preferably simultaneously and/or synchronizedly separation machined on the first machining station. Also possible within the framework of the present disclosure is to simultaneously and/or synchronizedly bend an additional surface component in the second machining station. The additional machining station and first machining station are preferably arranged and/or linked together in such a way that, once formed, the first surface component is conveyed directly from the second machining station to the first machining station, so as to there be subjected to separation machining. The additional and first machining stations can be linked together by means of the transport vehicle or an additional individual transport vehicle. Also possible within the framework of the present disclosure is interlinking via the additional conveyor belts.

In a preferred embodiment of the present disclosure, the production line includes one or more controller, hereinafter referred to as the controller. The controller is preferably designed to actuate the separating device and/or bending/forming device. The controller optionally exhibits a first and a second data record. In particular, the controller is programmed with the first and second data records. The first and second data records preferably differ from each other in terms of content. In particular, the controller is programmed differently with the first and second data records, so that the separating device can be differently actuated based on the data records.

It is preferred that the controller actuate the separating device based on the first data record so as to separate the surface component along a first machining path. The controller optionally actuates the separating device based on the second data record so as to separate the surface component along a second machining path. It is here especially preferred that the first and second machining paths differ from each other. As a result, the surface component can be flexibly and variably machined by the same separating device. For example, the surface component can be given two different contours by the same separating device.

In a preferred implementation of the present disclosure, the controller includes a third and fourth data record. In particular, the controller is programmed with the third and fourth data records. The third and fourth data records preferably differ in terms of content from each other, and optionally also from the respective first and second data records. In particular, the controller is programmed differently with the third and fourth data records, so that the bending/forming device can be varyingly actuated based on the data records.

The controller preferably actuates the bending/forming device based on the third data record so as to form and/or bend the surface component at least in one first bending/forming position. The controller optionally actuates the bending/forming device based on the fourth data record so as to form and/or bend the surface component at least in a second bending/forming position. It is especially preferred that the one bending/forming position and the second bending/forming position differ from each other. As a result, the surface component can be varyingly and flexibly machined in the different bending/forming positions by the same bending/forming device. For example, the surface component can be varyingly formed and/or bent in the bending/forming positions by the same bending/forming device.

A preferred embodiment of the present disclosure provides that the controller include a first controller and a second controller. It is preferable that the first controller be allocated to the separating device, and the second controller to the bending/forming device. In particular, the first controller is designed for actuating the separating device, and the second controller for actuating the bending/forming device. The first controller preferably exhibits a first and second data record, so that it can actuate the separating device in at least two different ways, causing the separating device to separation machine the at least one surface component in at least two different ways.

Also possible within the framework of the present disclosure is for the first surface component to be separating machined by the separating device based on the first data record, and the second surface component by the same separating device based on the second data record. As a consequence, the first and the second surface component can be separation machined in two different ways by the same separating device. This makes it possible to save on costs for generating different separating tools and/or machines, and to achieve a flexible manufacture of surface components.

The second controller preferably exhibits at least the third and fourth data records, so that it can actuate the bending/forming device in at least two different ways, as a result of which the bending/forming device can form and/or bend the at least one surface component in at least two different ways.

It is especially preferred for the first surface component to be formed and/or bent by the bending/forming device based on the third data record, and the second surface component with the same bending/forming device based on the fourth data record. As a consequence, the first and second surface components can be bent in two different ways by the same bending/forming device. This makes it possible to save on costs for generating different bending tools and/or machines, and to achieve a flexible manufacture of the surface components.

In a preferred embodiment of the method, the separating device separates the surface component along the at least one machining path. For example, the surface component is laser machined and/or laser separated with the separating device.

The bending/forming device optionally forms and/or bends the surface component within the framework of the method in the at least one bending/forming position. In particular, the surface component is bent and/or folded in the at least one bending/forming position by the bending/forming device. It is also possible for the bending/forming device to curve and/or bend sections of the surface extension of the surface component.

It is especially preferred within the framework of the method that the separating device and bending/forming device simultaneously and/or synchronizedly machine the surface component, in particular the first and second surface components. As an additional option, the separating device and bending/forming device work the surface component, in particular the first and second surface components, without temporary storage. In particular, the first surface component is separated in the first machining station by the separating device, while the second surface component in the second machining station is formed and/or bent over by the bending/forming device. This yields the advantage of a flexible and reduced-cost manufacture of the surface component within the production line.

In another preferred implementation of the method, the at least one surface component is conveyed from the first machining station to the second machining station directly and/or without temporary storage. In particular, once separated by the separating device, the first surface component is conveyed to the second machining station directly and/or immediately and, as an additional option, without temporary storage. It is there formed and/or bent over by the bending/forming device. During this process, for example, an additional surface component can be separated in the first machining station, in particular synchronized with the bending/forming device of the second machining station. After separated, the latter is preferably conveyed to the second machining station for forming and/or bending by the bending/forming device, preferably directly and immediately and, as an additional option, without temporary storage.

For example, the at least one surface component can be conveyed from the first to the second machining station by means of a conveyor vehicle and/or conveyor belts, which directly and/or immediately link the first machining station with the second machining station.

BRIEF DESCRIPTION OF THE DRAWINGS

The present disclosure will hereinafter be described in conjunction with the following drawing figures, wherein like numerals denote like elements.

FIG. 2b presents a sectional view of the surface component 5 along section line A-A from FIG. 2a;

Mutually corresponding or identical parts are each labeled with the same reference numbers on the figures.

DETAILED DESCRIPTION

The following detailed description is merely exemplary in nature and is not intended to limit the present disclosure or the application and uses of the present disclosure. Furthermore, there is no intention to be bound by any theory presented in the preceding background of the present disclosure or the following detailed description.

Figure 1:
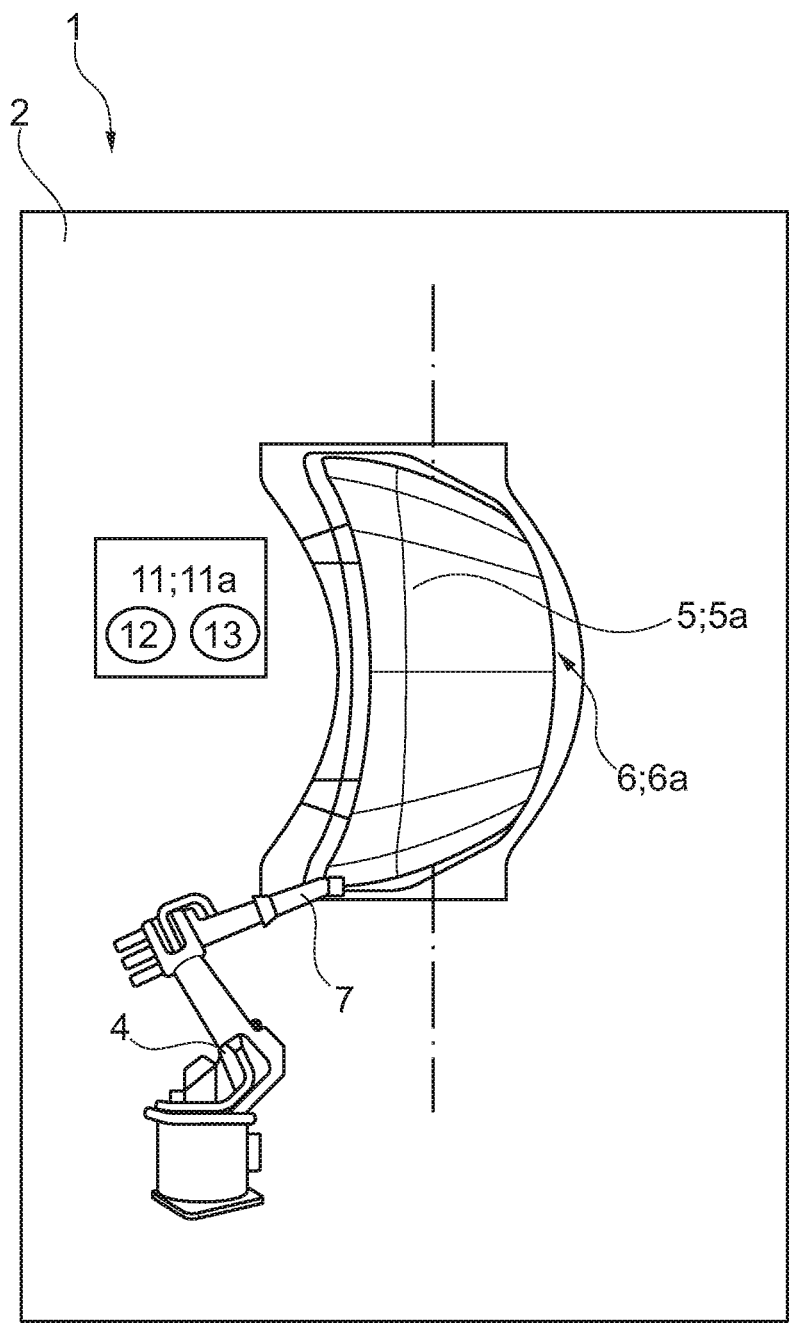
FIG. 1 is a first production station of a production line with a separating device.

FIG. 1 shows a first production station 2 of a production line 1. The production line 1 is designed for machining at least one surface component 5, for example a metal sheet for integration into a vehicle body. The surface component 5 includes a first surface component 5a and a second surface component 5b (not shown), for example which can be machined sequentially in the production line 1. The production line 1 exhibits at least one controller 11. The latter includes a first controller 11a, which is designed to actuate a separating device 4 of the first production station 2.

The separating device 4 can be used to separate the surface component 5 along a machining path 6. In particular, separation machining with the separating device 4 imparts a predetermined contour to the surface component 5, e.g., an outer contour. In an alternative exemplary embodiment, the first production station 2 includes two or more separating devices 4, with which the surface component 5 is separated, thereby separating it along the machining path 6. The separating device 4 may be a first jointed-arm robot including a separating tool 7. In particular, the first jointed-arm robot is fitted with the separating tool 7, so that it can operate and move along the machining path 6. The separating tool 7 is designed as a laser tool for laser separating the at least one surface component 5.

The first controller 11a exhibits a first data record 12 and a second data record 13, which differ from each other in terms of content. In particular, the first controller 11a is varyingly programmed with the first and second data records 12; 13. As a consequence, the first controller 11a can actuate the separating device 4 based on the first data record 12 to machine, in particular separate, the surface component 5, in particular the first surface component 5a, along a first machining path 6a (not shown). When the first controller 11a actuates the separating device 4 based on the second data record 13, the separating device 4 machines, in particular separates, the surface component 5, e.g., the second surface component 5b, along a second machining path 6b (not shown).

The first and second machining paths 6a, 6b are varyingly designed. In particular, the first surface component 5a can be machined with the separating device 4 based on the first data record 12 to exhibit a contour different than the second surface component 5b machined with the separating device 4 based on the second data record 13. However, it is also possible for the same surface component 5 to be separation machined with the separating device 4 in the first machining station 2 initially based on the first data record 12 and subsequently based on the second data record 13.

Programming the first controller 11a with the two different data records 12; 13 makes it possible to flexibly separation machine the surface component 5 with the same separating device 4. This enables a savings on costs for several different separating tools and/or machines. In addition, the process of manufacturing the surface component 5 in the production line 1, in particular in the machining station 2, can be flexibly and quickly changed.

Figure 2A:
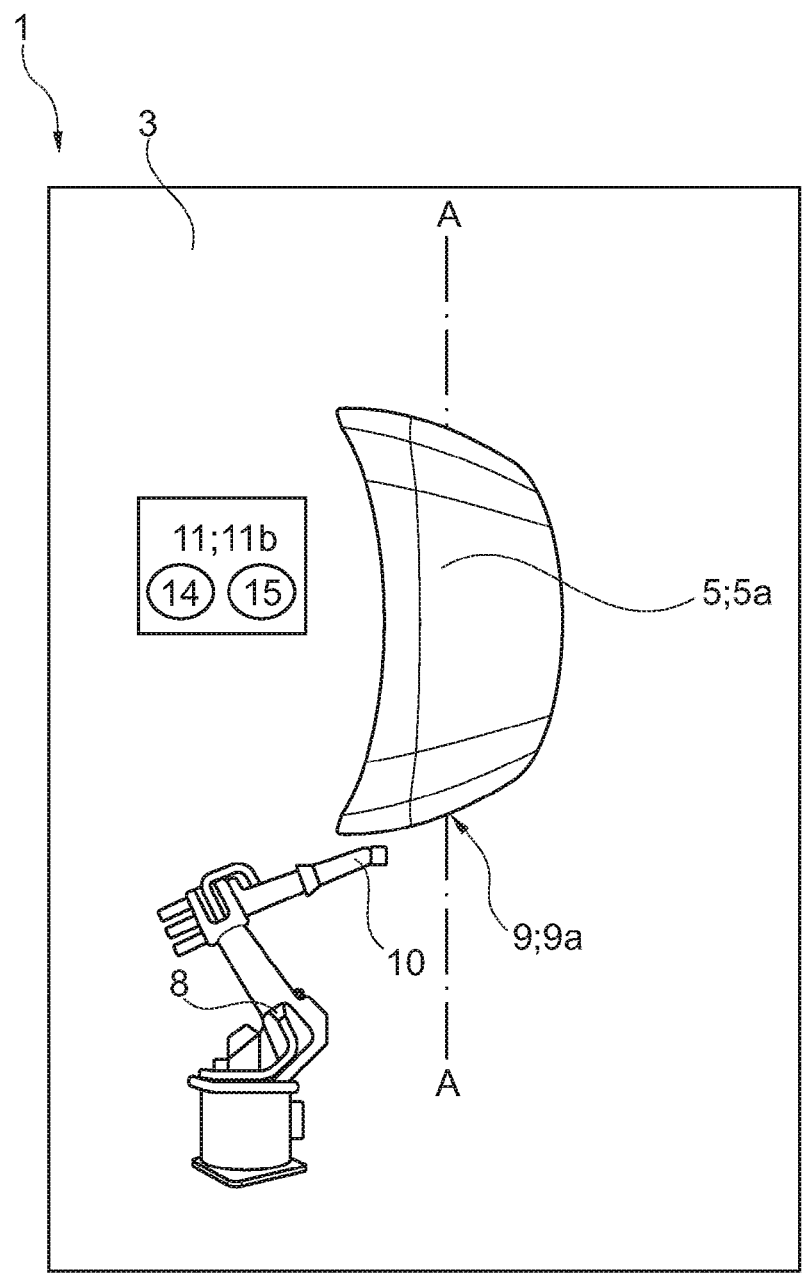
FIG. 2a is a second production station of the production line with a bending/forming device.

FIG. 2a shows a second machining station 3 of the production line 1. The machining station 3 exhibits a bending/forming device 8, with which the surface component 5 can be bent and/or folded in at least one bending/forming position 9. The bending/forming device 8 is designed as a second jointed-arm robot that exhibits a bending/forming tool 10. The bending/forming tool 10 is designed as a tong. As an alternative, the bending/forming tool 10 can also be designed as a stamp, with which pressure is exerted on the at least one surface component 5, forming the latter. In an alternative exemplary embodiment, the second production station 3 exhibits two or more bending/forming devices 8, with which at least sections of the surface component 5 are formed and/or bent.

Figure 2B:
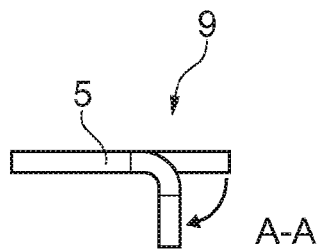

FIG. 2b presents a sectional view of the surface component 5 along section line A-A from FIG. 2a. The surface component 5 is bent and/or formed in the bending/forming position 9, in particular bent over. The bending/forming position 9 lies on the already separated machining path 6 of the at least one surface component 5. For example, at least sections or the entire bending/forming position 9 can here extend along the machining path 6. The surface component 5 is shown bent along the machining path 6, in particular along the outer contour of the surface component 5. The bend preferably measures at least 40 degrees, in particular at least 60 degrees, in particular at least 80 degrees and/or at most 180 degrees relative to a surface extension of the surface component 5.

The controller 11 includes a second controller 11b. The latter exhibits a third data record 14 and a fourth data record 15. In particular, the second controller 11b is varyingly programmed with the third and fourth data records 14; 15. The third data record 14 differs from the fourth data record 15 in terms of content. Based on the third data record 14, the second controller 11 actuates the bending/forming device 8, which forms and/or bends the surface component 5, in particular the first surface component 5a, in at least a first bending/forming position 9a. When the second controller 11b actuates the bending/forming device 8 based on the fourth data record 15, the surface component 5, for example the second surface component 5b, is bent and/or formed in at least a second bending/forming position 9b (not shown).

The first bending/forming position 9a and the second bending/forming position 9b differ from each other. As a consequence, the first surface component 5a can be molded and/or bent in positions and/or in ways other than the second surface component 5b. However, it is also possible for the same surface component 5 to be formed and/or bent in the second machining station 3 initially based on the third data record 13 and subsequently based on the fourth data record 15.

Programming the second controller 11b with the third and fourth data record 14; 15 makes it possible to flexibly and varyingly bend and/or form the individual surface components 5; 5a; 5b within the production line 1. This enables a savings in costs for building various forming/bending tools and/or machines, and the achievement of enhanced flexibility within the production line 1.

Figure 3:
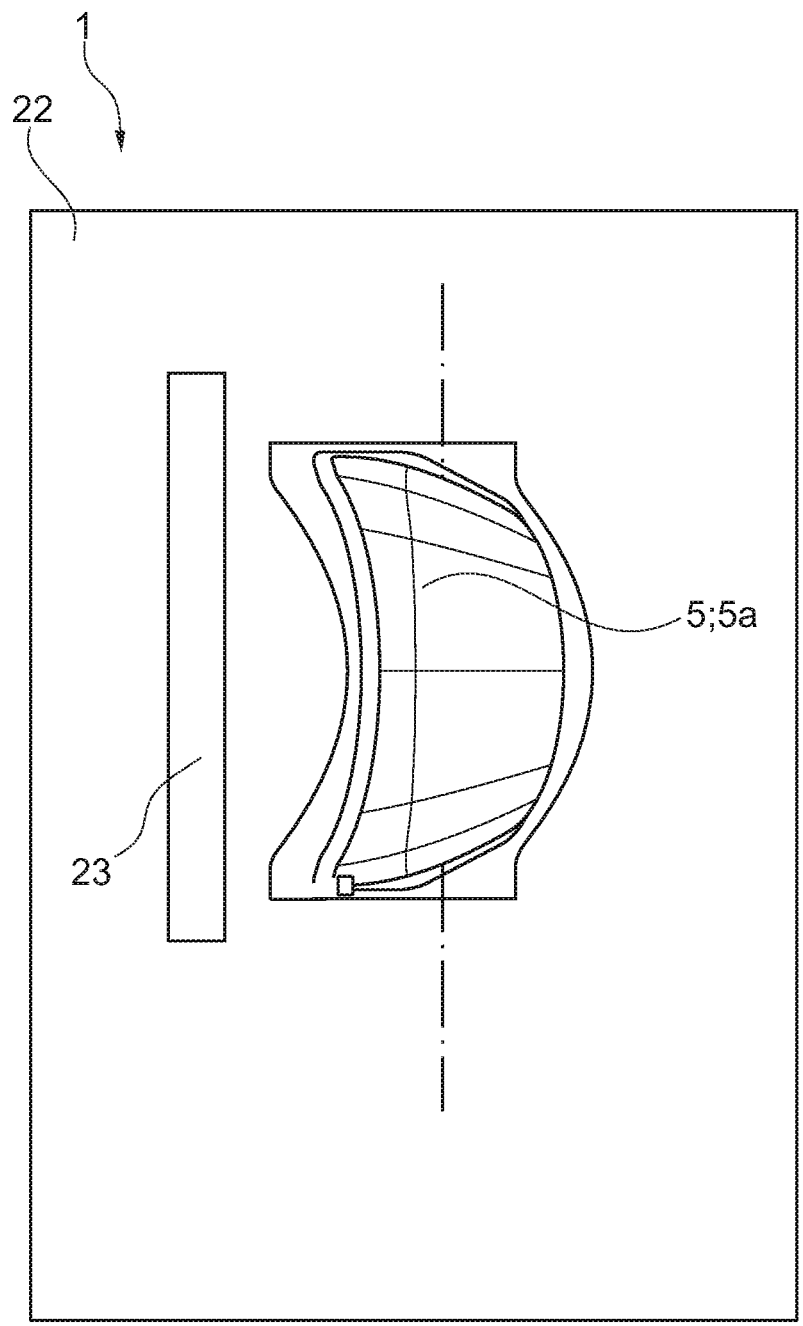
FIG. 3 is another production station of the production line with a forming device.

The first machining station 2 shown on FIG. 1 and the second machining station 3 shown on FIG. 3 are arranged one directly after the other and/or linked with each other within the production line 1. In particular, the material flow of the surface component 5 from the first machining station 2 to the second machining station 3 is immediate and direct, in particular without temporary storage. For example, the at least one surface component 5 can be conveyed from the first machining station 2 to the second machining station 3 by means of conveying vehicles and/or conveyor belts, which interconnect the first machining station 2 and second machining station 3. The machining of the first surface component 5a with the separating device 4 in the first machining station 2 is synchronized with the machining of the second surface component 5b with the bending/forming device 8 in the second machining station 3. Synchronizing the process of machining the first and second surface components 5a; 5b and forgoing a temporary storage makes it possible to reduce the production time within the production line, and thereby save on production costs.

FIG. 3 shows another machining station 22 of the production line 1. The additional machining station 22 includes a forming device 23, which is designed as a forming press. The surface component 5 is flatly formed and, as an additional option, pressed in its surface extension in the forming device 23. In particular, at least 70 percent, preferably at least 80 percent of the surface extension of the surface component 5 is formed and, as an additional option, pressed. It is also possible for the at least one surface component 5 to be formed and, as an additional option, pressed in the forming device 23 in its entirety, i.e., over 100 percent of the surface extension.

The additional machining station 22 is arranged in the production line 1 immediately before the first production station 1. In particular, the additional machining station 22 is directly linked with the first machining station 2. In particular, the material flow of the surface component 5 between the additional machining station 22 and first machining station 2 is immediate and direct, in particular without temporary storage.

For example, the surface component 5 can be conveyed from the additional machining station 22 to the first machining station 2 by means of a conveying vehicle and/or conveyor belts, which interconnect the additional machining station 22 and first machining station 2. The machining of the first surface component 5a with the forming device 23 in the additional machining station 22 is synchronized with the machining of the second surface component 5b with the separating device 4 in the first machining station 2 and/or is synchronized with the machining of an additional surface component with the bending/forming device 8 in the second machining station 3.

Figure 4:
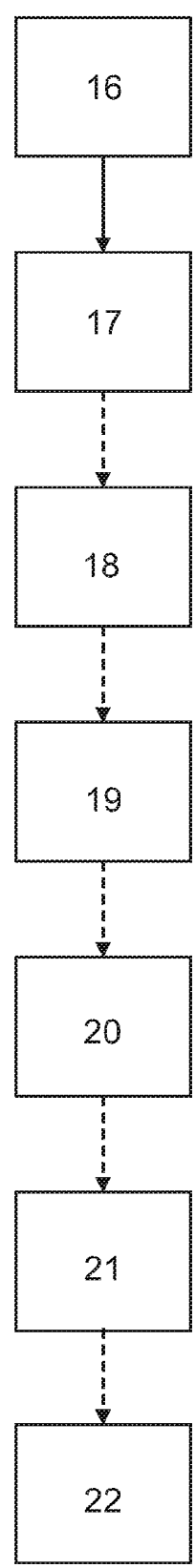
FIG. 4 is a schematic view of a method for machining at least one surface component in the production line.

FIG. 4 presents a flow chart of a procedural sequence for machining the surface component 5 in the production line 1, the machining stations 2; 3 of which are shown on FIGS. 1 and 2. The method includes the following procedural step. At block 16, the surface component 5 is machined in the production line 1 such that the separating device 4 separates the one surface component 5 along the at least one machining path 6.

The method further includes the following optional steps, which can also be switched in terms of their sequence. At block 17, the surface extension of the surface component 5 is formed in the additional machining station 22.

At block 18, the bending/forming device 8 forms and/or bends the surface component 5 in the at least one bending/forming position 9. At block 19, the separating device 4 and bending/forming device 8 and, as an additional option, the forming device 23 machines the surface component 5 in a synchronized manner. At block 20, the separating device 4 and bending/forming device 8 and, as an additional option, the forming device 23 machines the surface component 5 without temporary storage.

At block 21 the the surface component 5 is conveyed from the first machining station 2 to the second machining station 3 directly, immediately and/or without temporary storage. At block 22, the surface component 5 is conveyed from the additional machining station 22 to the first machining station 2 directly, immediately and/or without temporary storage.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A production line to machine a metal sheet for assembly into a vehicle body comprising:
   a first machining station including at least one separating device configured to separate at least one surface component along at least a first machining path and a second machining path from the metal sheet, the first machining station including a first controller configured to actuate the at least one separating device, the first controller having a first data set and a second data set, the first controller executes the first data set to actuate the at least one separating device to separate the at least one surface component along the first machining path and the first controller executes the second data set to actuate the at least one separating device to separate the at least one surface component along the second machining path, with the second machining path different than the first machining path;
   a second machining station including at least one bending/forming device configured to form the at least one surface component in at least one forming position, the second machining station including a second controller configured to actuate the at least one bending/forming device, the second controller having a third data set and a fourth data set;
   wherein the first and second machining stations are sequentially arranged and/or linked together.

2. The production line according to claim 1, wherein the at least one separating device comprises a jointed-arm robot with the at least one separating tool.

3. The production line according to claim 2, wherein the at least one bending/forming device comprises a second jointed-arm robot with the at least one bending/forming tool.

4. The production line according to claim 1, wherein the at least one bending/forming device comprises a jointed-arm robot with the at least one bending/forming tool.

5. The production line according to claim 1, wherein the production line further comprises a third machining station including a forming device configured to flatly form a surface extension of at least one surface component.

6. The production line according to claim 5, wherein the third machining station is sequentially arranged immediately before the first machining station and/or linked thereto.

7. The production line according to claim 1 further comprising:
   the third data set configured to actuate the at least one controller for operating the bending/forming device so as to form the at least one surface component in at least one first bending/forming position; and
   the fourth data set configured to actuate the at least one controller for operating the bending/forming device so as to form the at least one surface component in at least one second bending/forming position;
   wherein the at least one first bending/forming position and the at least one second bending/forming position are different.

8. A method for machining at least one surface component in a production line according to claim 1, wherein the at least one separating device separates the at least one surface component along the at least one machining path.

9. The method according to claim 8, wherein the at least one bending/forming device forms the at least one surface component in the at least one bending/forming position.

10. The method according to claim 8, wherein the forming device flatly forms at least a portion of a surface extension of the at least one surface component.

11. The method according to claim 8, wherein the at least one separating device and the at least one bending/forming device machine the at least one surface component in a synchronized manner.

12. The method according to claim 8, wherein the at least one separating device and the at least one bending/forming device machine the at least one surface component without temporary storage thereof.

13. The method according to claim 8, further comprising conveying the at least one surface component from the first machining station to the second machining station directly, immediately and/or without temporary storage thereof.

* * * * *